(12) United States Patent
Chiasson et al.

(10) Patent No.: US 10,781,754 B2
(45) Date of Patent: Sep. 22, 2020

(54) SYSTEM AND METHOD FOR ROTOR BOW MITIGATION

(71) Applicant: PRATT & WHITNEY CANADA CORP., Longueuil (CA)

(72) Inventors: Matthew Chiasson, Milton (CA); Jason Tremblay, Montréal (CA); Leonard Bezman, Brossard (CA); Ioan Sabau, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 280 days.

(21) Appl. No.: 15/836,010

(22) Filed: Dec. 8, 2017

(65) Prior Publication Data

US 2019/0178165 A1 Jun. 13, 2019

(51) Int. Cl.
| | |
|---|---|
| *F02C 7/26* | (2006.01) |
| *F01D 25/34* | (2006.01) |
| *F01D 19/02* | (2006.01) |
| *F01D 5/02* | (2006.01) |
| *F01D 21/08* | (2006.01) |

(Continued)

(52) U.S. Cl.
CPC ............... *F02C 7/26* (2013.01); *F01D 5/027* (2013.01); *F01D 19/02* (2013.01); *F01D 21/06* (2013.01); *F01D 21/08* (2013.01); *F01D 25/34* (2013.01); *F02C 7/268* (2013.01); *F02C 9/28* (2013.01); *F05D 2240/24* (2013.01); *F05D 2260/80* (2013.01); *F05D 2260/85* (2013.01); *F05D 2260/941* (2013.01); *F05D 2270/304* (2013.01); *F05D 2300/5021* (2013.01)

(58) Field of Classification Search
CPC .......... F01D 25/34; F01D 25/36; F01D 19/00; F01D 19/02; F01D 21/00; F01D 21/04; F01D 21/08; F01D 21/06; F01D 5/027; F02C 7/26; F02C 7/275; F02C 7/268; F02C 7/27; F02C 7/277; F02C 9/00; F02C 9/28; F05D 2260/85; F05D 2260/941; F05D 2260/80; F05D 2260/82; F05D 2270/114; F05D 2270/304; F05D 2270/313; B64D 31/00; B64D 31/02; B64D 31/16; B64F 1/34; F04D 29/662; G05B 23/0224–024
See application file for complete search history.

(56) References Cited

U.S. PATENT DOCUMENTS

| | | | | |
|---|---|---|---|---|
| 4,738,098 A | * | 4/1988 | McMahon | ............... F01D 21/12 244/17.11 |
| 6,498,978 B2 | | 12/2002 | Leamy et al. | |

(Continued)

FOREIGN PATENT DOCUMENTS

| | | |
|---|---|---|
| CN | 103917749 | 7/2014 |
| CN | 103925018 | 7/2014 |

(Continued)

*Primary Examiner* — Alain Chau
(74) *Attorney, Agent, or Firm* — Norton Rose Fulbright Canada LLP

(57) ABSTRACT

A system and method for rotor bow mitigation for a gas turbine engine are provided. An elapsed time since a shutdown of the engine and an idle operation time of the engine prior to the shutdown are determined. A rotor bow mitigation period is determined based on the elapsed time and the idle operation time and, prior to initiating a start sequence of the engine, the engine is motored for a duration of the rotor bow mitigation period.

15 Claims, 5 Drawing Sheets

(51) Int. Cl.
*F02C 7/268* (2006.01)
*F01D 21/06* (2006.01)
*F02C 9/28* (2006.01)

(56) References Cited

U.S. PATENT DOCUMENTS

| | | | |
|---|---|---|---|
| 6,575,699 B1* | 6/2003 | Jones | F01D 5/26 |
| | | | 415/176 |
| 7,507,070 B2* | 3/2009 | Jones | F01D 5/26 |
| | | | 415/176 |
| 7,742,881 B2 | 6/2010 | Muralidharan et al. | |
| 8,820,046 B2 | 9/2014 | Ross et al. | |
| 8,918,264 B2* | 12/2014 | Jegu | F01D 21/003 |
| | | | 701/100 |
| 9,121,309 B2 | 9/2015 | Geiger | |
| 9,347,321 B2* | 5/2016 | Heidari | G01M 1/22 |
| 9,664,070 B1 | 5/2017 | Clauson et al. | |
| 9,988,987 B2 | 6/2018 | Mouze et al. | |
| 10,030,580 B2 | 7/2018 | Ethier et al. | |
| 10,040,577 B2 | 8/2018 | Teicholz et al. | |
| 10,041,414 B2* | 8/2018 | Zaccaria | F02C 7/277 |
| 10,125,690 B2 | 11/2018 | Zaccaria et al. | |
| 10,125,691 B2 | 11/2018 | Feulner et al. | |
| 10,174,678 B2 | 1/2019 | Schwarz et al. | |
| 10,309,363 B2* | 6/2019 | Johnson | F02N 19/10 |
| 10,371,002 B2* | 8/2019 | Descamps | F01D 19/00 |
| 10,443,505 B2* | 10/2019 | Virtue, Jr. | F01D 19/00 |
| 10,443,507 B2* | 10/2019 | Schwarz | F01D 25/34 |
| 10,508,601 B2* | 12/2019 | Sheridan | F02C 7/275 |
| 10,539,079 B2* | 1/2020 | Schwarz | F02C 7/268 |
| 2003/0152457 A1* | 8/2003 | Jones | F01D 19/00 |
| | | | 415/199.5 |
| 2007/0031249 A1* | 2/2007 | Jones | F04D 29/321 |
| | | | 415/200 |
| 2012/0316748 A1* | 12/2012 | Jegu | F02C 7/262 |
| | | | 701/100 |
| 2014/0123673 A1* | 5/2014 | Mouze | F01D 19/02 |
| | | | 60/778 |
| 2014/0373518 A1* | 12/2014 | Manneville | F01D 19/02 |
| | | | 60/327 |
| 2014/0373552 A1* | 12/2014 | Zaccaria | F02C 7/277 |
| | | | 60/778 |
| 2014/0373553 A1* | 12/2014 | Zaccaria | F02C 7/277 |
| | | | 60/778 |
| 2015/0121874 A1* | 5/2015 | Yoshida | F01K 7/165 |
| | | | 60/657 |
| 2015/0183435 A1* | 7/2015 | Johnson | F02N 19/10 |
| | | | 701/112 |
| 2016/0032725 A1* | 2/2016 | Heidari | G01M 1/34 |
| | | | 701/33.1 |
| 2016/0348588 A1 | 12/2016 | Ross et al. | |
| 2017/0122125 A1 | 5/2017 | Colley et al. | |
| 2017/0233103 A1* | 8/2017 | Teicholz | B64D 27/16 |
| | | | 701/100 |
| 2017/0234230 A1 | 8/2017 | Schwarz et al. | |
| 2017/0234231 A1 | 8/2017 | Virtue, Jr. et al. | |
| 2017/0234232 A1 | 8/2017 | Sheridan et al. | |
| 2017/0234233 A1 | 8/2017 | Schwarz et al. | |
| 2017/0234236 A1 | 8/2017 | Feulner et al. | |
| 2017/0234238 A1 | 8/2017 | Schwarz et al. | |
| 2017/0335768 A1 | 11/2017 | Steen et al. | |
| 2017/0335772 A1* | 11/2017 | Coldwate | F01D 25/34 |
| 2017/0335865 A1 | 11/2017 | Steen | |
| 2017/0342855 A1 | 11/2017 | Hon et al. | |
| 2017/0342908 A1 | 11/2017 | Hon et al. | |
| 2017/0356302 A1* | 12/2017 | Descamps | F02C 9/00 |
| 2017/0363012 A1 | 12/2017 | Clauson et al. | |
| 2018/0010480 A1 | 1/2018 | Hockaday et al. | |
| 2018/0022463 A1* | 1/2018 | Teicholz | F02C 7/275 |
| | | | 60/778 |
| 2018/0023479 A1 | 1/2018 | Clauson et al. | |
| 2018/0142623 A1 | 5/2018 | Chiabrando et al. | |
| 2018/0283197 A1 | 10/2018 | Jackowski et al. | |
| 2018/0306065 A1 | 10/2018 | Keenan et al. | |
| 2018/0334963 A1 | 11/2018 | Fernholz et al. | |

FOREIGN PATENT DOCUMENTS

| | | |
|---|---|---|
| EP | 3205838 | 8/2017 |
| EP | 3205858 | 8/2017 |
| EP | 3211184 | 8/2017 |
| IT | 1408656 | 5/2013 |
| KR | 1581180 | 7/2014 |
| PL | 225446 | 11/2014 |
| RU | 2579615 | 4/2016 |
| WO | 2016/069303 | 5/2016 |

* cited by examiner

US 10,781,754 B2

SYSTEM AND METHOD FOR ROTOR BOW MITIGATION

TECHNICAL FIELD

The application relates generally to gas turbine engines and, more particularly, to rotor bow mitigation in a gas turbine engine.

BACKGROUND OF THE ART

Following shutdown of a gas turbine engine, residual heat is trapped in the engine's high pressure compressor rotor drum. As the temperature of the rotor decreases towards ambient temperature, a thermal gradient develops in the rotor leading to the upper portion of the rotor cooling more slowly than the lower portion. This results in distortion (or bowing) of the rotor due to thermal expansion (or contraction). Damage can be caused to the engine if the engine rotors are spooled up while in a bowed state and it is undesirable to restart the engine until the rotor bow dissipates to an acceptable level. There is therefore a need for an improved system and method that will more quickly alleviate rotor bow.

SUMMARY

In one aspect, there is provided a method for rotor bow mitigation for a gas turbine engine, the method comprising determining an elapsed time since a shutdown of the engine, determining an idle operation time of the engine prior to the shutdown, determining a rotor bow mitigation period based on the elapsed time and the idle operation time, and, prior to initiating a start sequence of the engine, motoring the engine for a duration of the rotor bow mitigation period.

In another aspect, there is provided a system for rotor bow mitigation for a gas turbine engine, the system comprising a memory and a processing unit coupled to the memory and configured for determining an elapsed time since a shutdown of the engine, determining an idle operation time of the engine prior to the shutdown, determining a rotor bow mitigation period based on the elapsed time and the idle operation time, and, prior to initiating a start sequence of the engine, motoring the engine for a duration of the rotor bow mitigation period.

In a further aspect, there is provided a non-transitory computer readable medium having stored thereon program code executable by a processor for determining an elapsed time since a shutdown of a gas turbine engine, determining an idle operation time of the engine prior to the shutdown, determining a rotor bow mitigation period based on the elapsed time and the idle operation time, and, prior to initiating a start sequence of the engine, motoring the engine for a duration of the rotor bow mitigation period.

DESCRIPTION OF THE DRAWINGS

Reference is now made to the accompanying figures in which.

DETAILED DESCRIPTION

Figure 1:
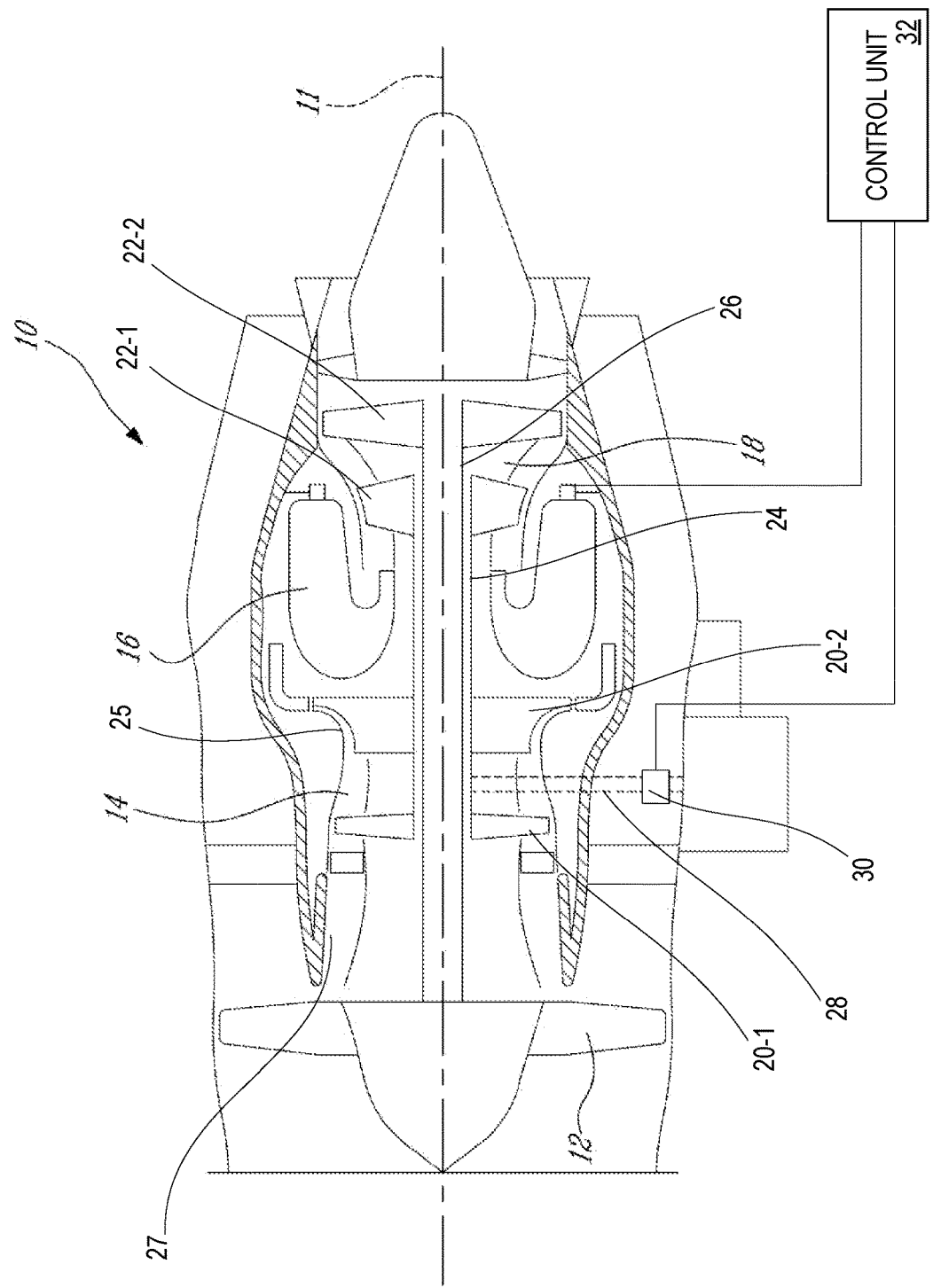
FIG. 1 is a schematic representation of a gas turbine engine, in accordance with an illustrative embodiment.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Compressor section 14 includes compressors 20, namely, a low-pressure compressor 20-1 and a high-pressure compressor 20-2. Turbine section 18 includes turbines 22, namely, a high-pressure turbine 22-1 and a low-pressure turbine 22-2.

Fan 12, compressors 20 and turbines 22 are mounted to shafts 24, 26 for rotation about a longitudinal axis 11. Low-pressure compressor 20-1, high-pressure compressor 20-2 and high-pressure turbine are mounted to a common first shaft 24, and may be collectively referred to as a high-speed spool or high-speed rotor assembly. Fan 12 and low-pressure turbine 22-2 are mounted to a common second shaft 26 and may be collectively referred to as a low-speed spool or low-speed rotor assembly. During operation, compressors 20 and combustor 16 provide a stream of high-temperature and high-pressure gas to turbines 22, causing turbines 22 to rotate. Rotation of turbines 22 drives rotation of compressors 20 and fan 12 by way of shafts 24, 26.

Engine 10 has an air starter 28 for inducing direct rotation of the high-speed and indirect rotation of the low-speed rotor assemblies at engine start-up. Air starter 28 is provided with a supply of pressurized air from an independent unit. Flow of air to starter 28 is modulated by a starter valve (also referred to as a starter air valve) 30.

Starter valve 30 is solenoid-actuated and operated (e.g. engaged) by a signal from a control unit 32. Control unit 32 is further in communication with a plurality of control elements and sensors, such as a throttle, speed and temperature sensors, and the like.

During operation of engine 10, pressurization of air by compressors 20 and fuel combustion in combustor 16 produce high temperatures, particularly in the combustor 16 and turbine section 18. Temperatures may depend on the operating state of engine 10, among other conditions. For example, high-thrust operation, such as high-speed cruising, may rely on high rates of fuel combustion, which may produce relatively high temperatures in turbine 18. Conversely, other operating states may require less thrust and thus may entail combustion of lower quantities of fuel. For example, while taxiing, (e.g. on a runway), fuel is combusted at a much lower rate, and less heat is introduced to engine 10.

High temperatures within engine 10 may persist for a period of time after engine shutdown. For example, airflow through engine 10 substantially ceases after engine 10 is shut down and air tends to stagnate within the core of engine 10. Thus, heat dissipates relatively slowly from the high operating temperatures of components.

While engine 10 is shut down, temperature distribution within the engine 10 may be asymmetrical. For example, relatively cool and dense air may settle toward the bottom of the engine 10. Conversely, hotter and less dense air may rise toward the top of the engine 10, resulting in a temperature profile that generally increases from bottom to top. In other words, components near the top of engine 10 may tend to remain hotter than components near the bottom of engine 10.

As noted, components of engine 10 may experience thermal expansion (or contraction) when subjected to elevated temperatures. Following engine shutdown, such thermal expansion (or contraction) may be non-uniform, due to temperature profiles within engine 10. As discussed herein above, as the temperature of a given rotor decreases towards ambient temperature, a thermal gradient develops in the rotor leading to an upper portion of the rotor cooling more slowly than a lower portion of the rotor, which results in distortion (or bowing).

Figure 2:
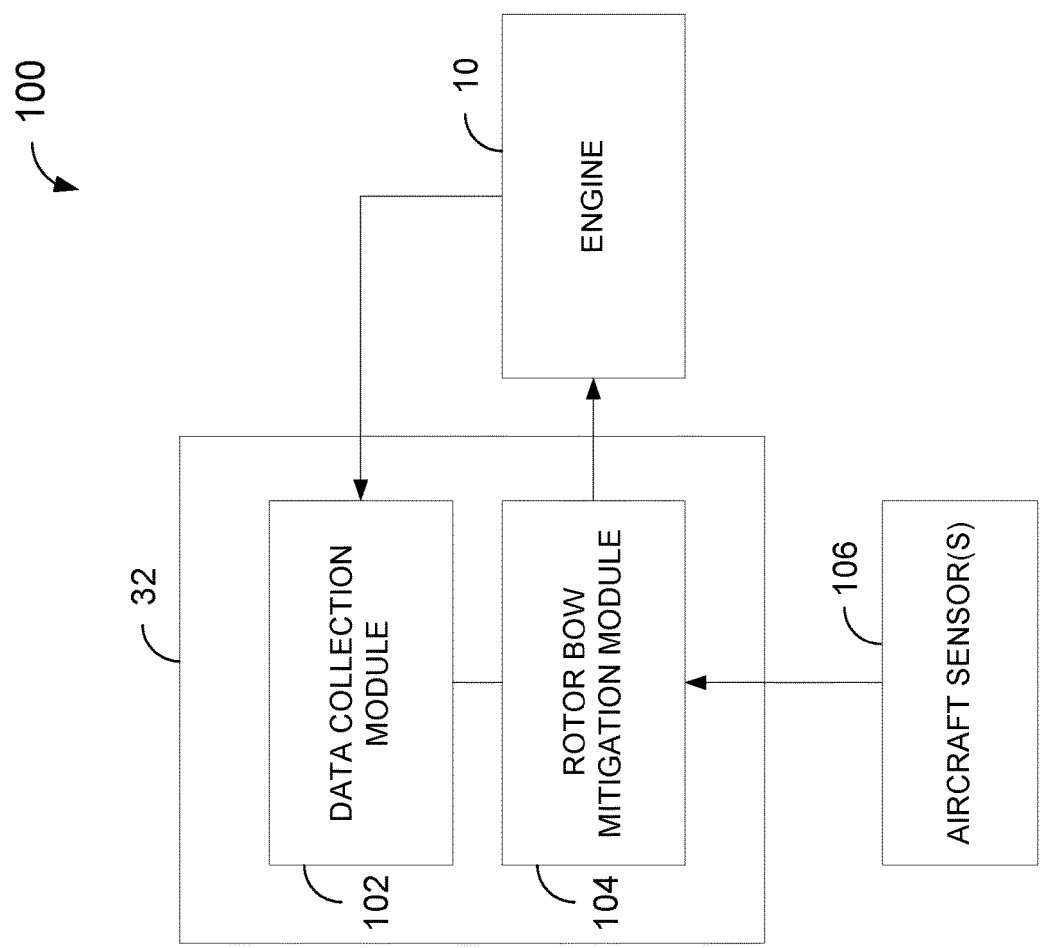
FIG. 2 is a block diagram of a system for rotor bow mitigation, in accordance with an illustrative embodiment.

FIG. 2 illustrates an example system 100 for rotor bow mitigation. As illustrated in FIG. 2, the system 100 comprises the control unit 32, which controls operation of the engine 10, and particularly operation of the starter valve (reference 30 in FIG. 1) that modulates the flow of air to the starter (reference 28 in FIG. 1). In one embodiment, the control unit 32 is an Electronic Engine Controller (EEC). The illustrated system 100 protects the engine 10 from spooling up with a rotor that has been deformed (e.g. bowed) due to asymmetric thermal expansion (or contraction). In one embodiment, the rotor bow mitigation procedure discussed herein is performed in order to alleviate (e.g. reduce) rotor distortion in the engine 10 prior to a start or motoring cycle. In particular, the rotor bow mitigation procedure is illustratively performed prior to initiating a start sequence that brings the engine 10 to idle, the start sequence comprising a number of successive steps (e.g. cranking of the engine 10, ignition of the engine 10, supply of fuel to the engine 10). The rotor bow mitigation procedure may therefore be applied to ground start and ground dry and wet motoring. For example, the rotor bow mitigation function may be commanded whenever an engine dry crank, wet crank, or ground start is commanded. The control unit 32 initiates a low speed motoring procedure (also referred to herein as a slow motoring cycle) prior to the commanded engine action in order to provide cooling air for alleviating the thermal gradient in the rotor, at a safe rotational speed. In one embodiment, the low speed motoring procedure is performed for a prescribed duration, by motoring the engine and controlling the engine at a safe speed that is lower than a resonant speed of the rotor. The commanded engine action is then initiated (e.g. by the control unit 32 without further pilot input) upon completion of the rotor bow mitigation procedure.

In one embodiment, the control unit 32 comprises a data collection module 102 and a rotor bow mitigation module 104. The illustrated data collection module 102 is configured to retain data between shutdowns of the engine 10, and more particularly to collect and store (e.g. track) engine usage history data. In one embodiment, the data collection module 102 tracks the amount of time that has elapsed since a previous reference shutdown of the engine 10. In one embodiment, the elapsed time since shutdown may be tracked using a timer that is started when the engine 10 is on the ground and the fan speed (N1) is below a selected idle rating plus a first predetermined tolerance. The timer is reset when N1 exceeds the idle rating plus the first tolerance for a first predetermined time period or N1 exceeds the idle rating plus a second predetermined tolerance for a second predetermined time period. The timer may also be reset if the engine 10 is at idle or above for a predetermined time period. It should be understood that other suitable means of tracking the elapsed time may be used. For example, in one embodiment, a timestamp of each shutdown may be captured and compared to the current time.

The data collection module 102 also tracks an idle operation time of the engine 10 prior to the previous shutdown. As used herein, 'idle operation time' refers to a time period spent by the engine at low power (e.g. at a power setting close to idle). In one embodiment, the idle operation time may be tracked using a timer that is started at engine shutdown, providing the timer is not already counting. If the engine 10 is shut down, started to idle, then shut down again, the timer illustratively continues counting from the first shutdown until N1 exceeds the selected idle rating plus the first tolerance for the first predetermined time period (e.g. 10 seconds continuously) or N1 exceeds the selected idle rating plus the second predetermined tolerance (e.g. 20%) for the second predetermined time period (e.g. 5 seconds continuously). When N1 exceeds the thresholds, the timer is reset. The timer may also be reset if the engine 10 is at idle or above for a predetermined time period (e.g. 2 minutes). It should be understood that other suitable means of tracking the idle operation time of the engine 10 may be used. For example, in one embodiment, timestamps may be used.

In one embodiment, tracking of the idle operation time enables to determine whether to reset (e.g. to zero) the elapsed time since the previous shutdown. The elapsed time since the previous shutdown is not reset if the engine is started and shut down within the predetermined time interval (e.g. 2 minutes) without being operated at high power. The elapsed time instead continues to be tracked (e.g. counted) from the previous reference shutdown time and the rotor bow time on the next engine start or motoring cycle can then be reduced.

The rotor bow mitigation module 104 illustratively uses the collected data to prescribe an appropriate slow motoring cycle, e.g. determine the time required to complete the rotor bow mitigation procedure. Because the magnitude of rotor distortion exhibits a predictable profile as a function of time, the slow motoring cycle can be prescribed based on the time since the previous engine shutdown. Also, the more time spent by the engine 10 at a low power setting (e.g. while taxiing or idling) prior to shutdown, the less slow motoring time is required to alleviate rotor distortion (i.e. the lower the duration of the prescribed slow motoring cycle). By recording at the data collection module 102 the time spent by the engine 10 within a given low power range prior to the engine 10 being shut down, the rotor bow mitigation module 104 can thus further optimize the slow motoring time. Using the data received from the data collection module 102, the rotor bow mitigation module 104 determines a base duration for the slow motoring cycle (referred to herein as a 'base rotor bow time'). The base rotor bow time may be determined by querying a lookup table (or other suitable data structure) that provides a value for the base rotor bow time as a function of the time since the previous engine shutdown and the idle operation time. The lookup table may be pre-calculated and stored in memory for subsequent access. In one embodiment, the lookup table is determined via engine testing and analysis to determine the slow motoring time required to alleviate rotor distortion caused by known initial conditions.

In one embodiment, the ambient conditions impacting the heat transfer characteristics of the air passing through the engine during rotor bow are also considered when determining the required slow motoring time. For this purpose, the rotor bow mitigation unit 104 is connected to one or more aircraft sensors 106 and receives therefrom input data (e.g. acquires measurements or readings from the sensors 106) indicative of ambient conditions. The sensors 106 may comprise, but are not limited to, one or more pressure and temperature sensors respectively configured to measure an ambient pressure and an ambient temperature. After determining the base rotor bow time as a function of the time since last shutdown and the time spent at low power prior to the engine shutdown, the rotor bow mitigation module 104 uses the current ambient pressure and temperature to compute a modifying factor (referred to herein as a 'rotor bow time modifier') that is applied to the base rotor bow time. The rotor bow time modifier takes account for the variation in heat transfer characteristics of air at different ambient conditions and can be used to further optimize (e.g. lengthen) the base rotor bow time. In one embodiment, the rotor bow time modifier is a multiplying factor that may be determined by querying a lookup table (or other suitable data structure) that provides a value for the rotor bow time modifier as a function of the ambient temperature and the ambient pressure. The lookup table may be pre-calculated and stored in memory for subsequent access. In one embodiment, the lookup table is determined via engine testing and analysis to determine the slow motoring time required to alleviate rotor distortion caused by known initial conditions.

The duration of the rotor bow mitigation procedure is then calculated by applying the rotor bow time modifier to the base rotor bow time (e.g. computing the product of the base rotor bow time and the rotor bow time modifier), while applying one or more constraints. One constraint may be that the rotor bow time modifier lengthens the base rotor bow time up to a given time limit. Another constraint may be that the duration of the rotor bow mitigation procedure is limited to a given value that cannot be exceeded.

The rotor bow mitigation procedure may be aborted by commanding an engine shutdown, e.g. following a pilot-initiated or an EEC-initiated rotor bow abort. For example, the rotor bow mitigation procedure may be aborted by commanding an engine shutdown when the commanded action (e.g. engine start or motoring command) has been aborted by the pilot. The rotor bow mitigation procedure may also be aborted when the control unit 32 detects a failure or exceedance of one or more engine rotation speed sensors (e.g. an N2 sensor, with N2 being the rotational speed of the engine's core compressor spool). For instance, the rotor bow mitigation procedure may be aborted by commanding an engine shutdown when N2 is less than a first speed threshold for a given time period (e.g. 20 seconds), N2 is less than the first threshold for a given time interval (e.g. 2 seconds) after N2 has transitioned above the first threshold, N2 has exceeded a second speed threshold, or there is no valid engine rotation speed sensor signal (e.g. N2 signal) after a given time interval (e.g. 10 seconds) has elapsed since the starter valve (reference 30 in FIG. 1) has been commanded open. In one embodiment, the first threshold corresponds to a low speed abort threshold, where the rotor bow mitigation procedure is aborted in case the engine does not perform as expected (e.g. is not able to govern). In one embodiment, the second speed threshold is a threshold set to protect the rotor from approaching a resonant speed. The rotor now mitigation procedure may also be aborted if the engine's fire handle is pulled during the rotor bow mitigation procedure.

Once the rotor bow mitigation module 104 has determined a final (e.g. optimized) value for the slow motoring time to be prescribed to the engine 10, one or more signals are sent to the engine 10 to initiate the slow motoring cycle in order to provide cooling air for alleviating the thermal gradient in the rotor.

Figure 3:
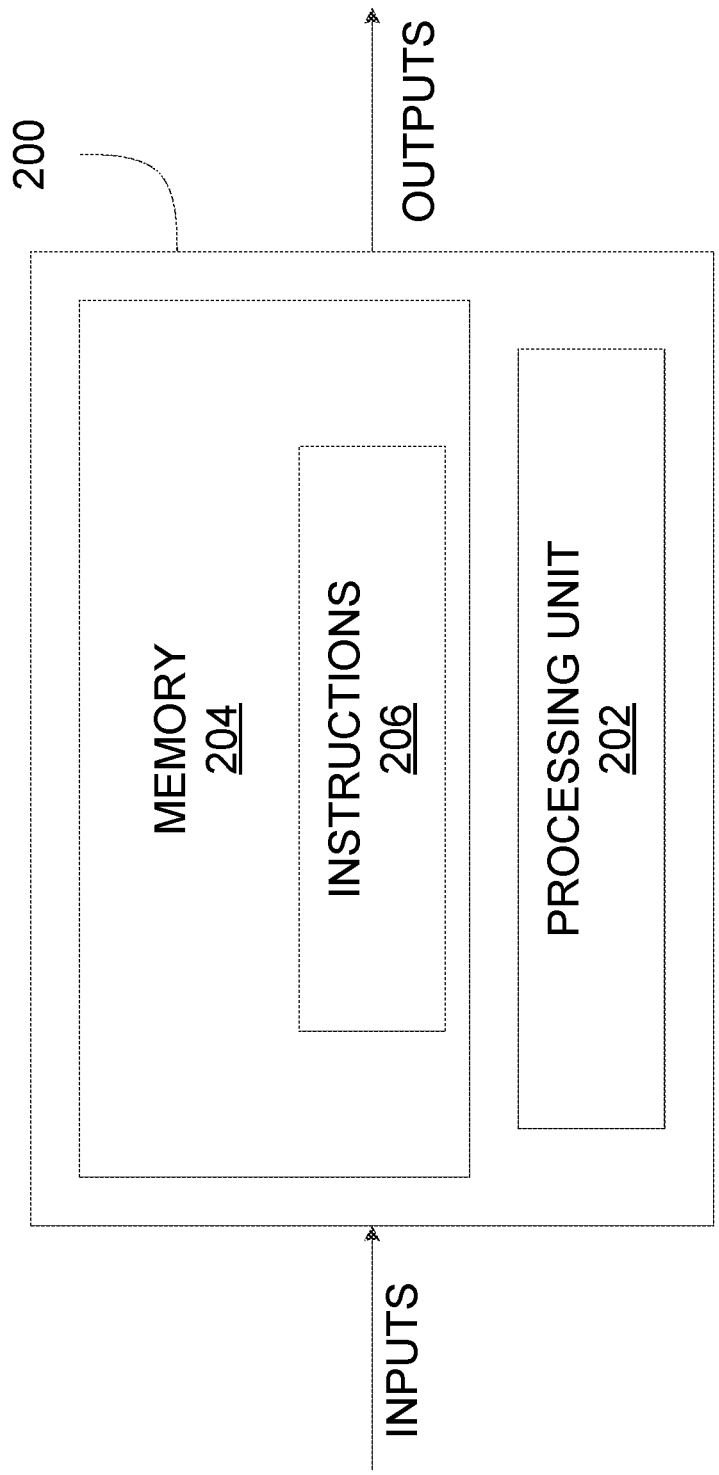
FIG. 3 is a block diagram of a computing device for implementing the control unit of FIG. 2, in accordance with an illustrative embodiment.

FIG. 3 is an example embodiment of a computing device 200 for implementing the control unit 32 described above with reference to FIG. 2. The computing device 200 comprises a processing unit 202 and a memory 204 which has stored therein computer-executable instructions 206. The processing unit 202 may comprise any suitable devices configured to cause a series of steps to be performed such that instructions 206, when executed by the computing device 200 or other programmable apparatus, may cause the functions/acts/steps specified in the method described herein to be executed. In one embodiment, the processing unit 202 has the ability to interpret discrete inputs and energize discrete outputs. The processing unit 202 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 204 may comprise any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 204 may comprise any storage means (e.g., devices) suitable for retrievably storing machine-readable instructions 206 executable by processing unit 202.

Figure 4:
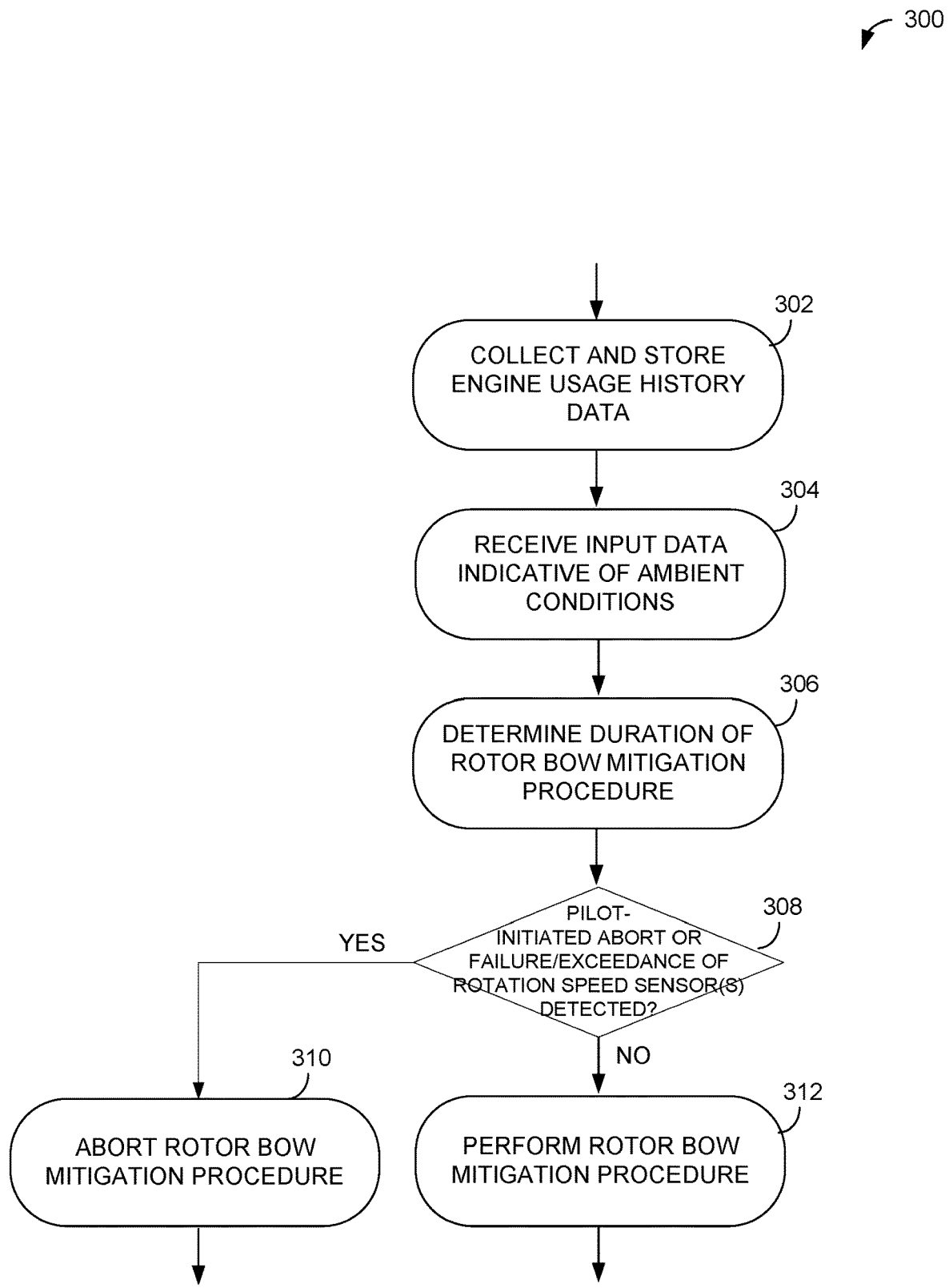
FIG. 4 is a flowchart of a method for rotor bow mitigation, in accordance with an illustrative embodiment.
Figure 5:
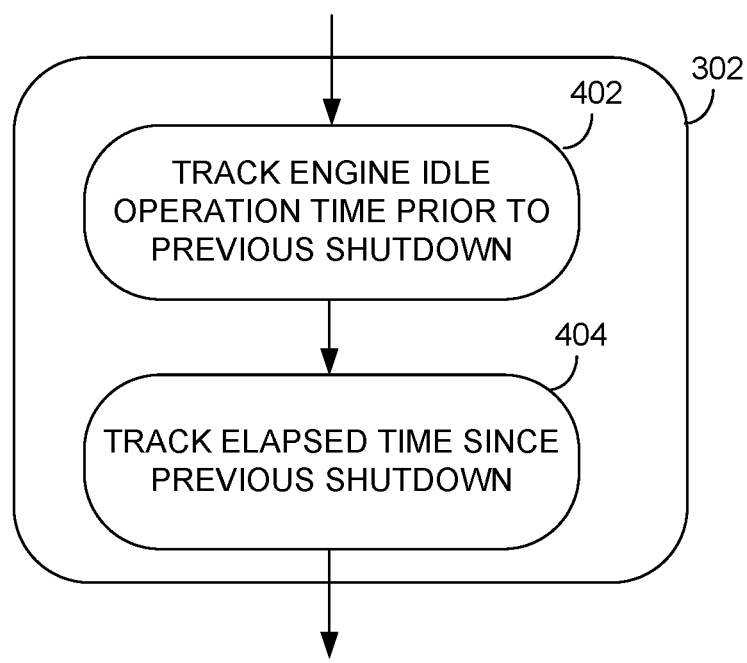
FIG. 5 is a flowchart of the step of FIG. 4 of collecting and storing engine usage history data.

Referring now to FIG. 4 and FIG. 5, an example method 300 for rotor bow mitigation will now be described. The method 300 may be implemented by the computing device 200 of FIG. 3. The method 300 comprises collecting and storing engine usage history data at step 302. As show in FIG. 5, step 302 illustratively comprises tracking the engine idle operation time prior to the previous engine shutdown (step 402) and tracking the elapsed time since the previous engine shutdown (step 404) in the manner described above with reference to FIG. 2. Input data indicative of ambient conditions is also received at step 304, e.g. from one or more temperature and pressure sensors. It should be understood that the order of steps 302 and 304 may be interchanged. A duration of the rotor bow mitigation procedure (e.g. a duration of a slow motoring cycle to be prescribed to the engine) is then determined at step 306 in the manner described above with reference to FIG. 2. For example, a base rotor bow time is calculated based on the engine idle operation time and the elapsed time since shutdown, a rotor bow time modifier is calculated based on the input data indicative of ambient conditions, and the rotor bow time modifier is applied to the base rotor bow time in order to obtain the duration of the rotor bow mitigation procedure, which is optimized (e.g. tailored to the engine's current thermal state). The next step 308 may then be to assess whether a pilot-initiated abort command or a failure or exceedance of the engine rotation speed sensor(s) (e.g. an EEC-initiated abort event) has occurred. If this is the case, the rotor bow mitigation procedure is aborted (step 310). Otherwise, the rotor bow mitigation procedure is performed at step 312 by initiating the slow motoring cycle for the duration determined at step 306 in order to provide cooling air to the engine for alleviating the thermal gradient in the rotor.

The system and method described herein may allow to minimize the time required to alleviate rotor distortion due to thermal effects. Indeed, the calculated rotor bow time is illustratively tailored to the current thermal state of a given engine, therefore reducing the time required to start or motor an engine containing a rotor in a distorted state. If the rotor mitigation procedure discussed herein was not to be performed, excessive vibration may occur as the engine rotor speeds increase, potentially leading to damage to engine hardware (e.g. damage to bearings, blade rub, and the like).

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method for rotor bow mitigation for a gas turbine engine, the method comprising:
    determining an elapsed time since a shutdown of the engine;
    determining an idle operation time of the engine prior to the shutdown;
    determining a rotor bow mitigation period based on the elapsed time and the idle operation time; and
    prior to initiating a start sequence of the engine, motoring the engine for a duration of the rotor bow mitigation period.

2. The method of claim 1, wherein motoring of the engine is at a speed lower than a rotor resonant speed.

3. The method of claim 1, wherein determining the idle operation time comprises determining a period of time during which a power level of the engine is below a predetermined threshold.

4. The method of claim 1, further comprising collecting history data related to operation of the engine, wherein the elapsed time since shutdown and the idle operation time are determined from the collected history data.

5. The method of claim 1, wherein the engine is motored prior to one of a ground start, a ground dry motoring, and a ground wet motoring of the engine.

6. The method of claim 1, further comprising receiving input data indicative of ambient conditions impacting heat transfer characteristics of air passing through the engine during rotor bow and determining the rotor bow mitigation period based on the input data.

7. The method of claim 6, wherein the received input data comprises at least one of an ambient pressure and an ambient temperature and further wherein determining the rotor bow mitigation period comprises:
    computing a base duration as a function of the elapsed time and the idle operation time;
    computing a modifying factor as a function of the at least one of the ambient pressure and the ambient temperature; and
    applying the modifying factor to the base duration and to obtain the rotor bow mitigation period.

8. A system for rotor bow mitigation for a gas turbine engine, the system comprising:
    a memory; and
    a processing unit coupled to the memory and configured for:
        determining an elapsed time since a shutdown of the engine;
        determining an idle operation time of the engine prior to the shutdown;
        determining a rotor bow mitigation period based on the elapsed time and the idle operation time; and
        prior to initiating a start sequence of the engine, motoring the engine for a duration of the rotor bow mitigation period.

9. The system of claim 8, wherein the processing unit is configured for motoring the engine at a speed lower than a rotor resonant speed.

10. The system of claim 8, wherein the processing unit is configured for determining the idle operation time comprising determining a period of time during which a power level of the engine is below a predetermined threshold.

11. The system of claim 8, wherein the processing unit is configured for collecting history data related to operation of the engine and for determining the elapsed time since shutdown and the idle operation time from the collected history data.

12. The system of claim 8, wherein the processing unit is configured for motoring the engine prior to one of a ground start, a ground dry motoring, and a ground wet motoring of the engine.

13. The system of claim 8, wherein the processing unit is configured for receiving input data indicative of ambient conditions impacting heat transfer characteristics of air passing through the engine during rotor bow and for determining the rotor bow mitigation period based on the input data.

14. The system of claim 13, wherein the processing unit is configured for receiving the input data comprising at least one of an ambient pressure and an ambient temperature and for determining the rotor bow mitigation period comprising:
    computing a base duration as a function of the elapsed time and the idle operation time;
    computing a modifying factor as a function of the at least one of the ambient pressure and the ambient temperature; and
    applying the modifying factor to the base duration to obtain the rotor bow mitigation period.

15. A non-transitory computer readable medium having stored thereon program code executable by a processor for:
    determining an elapsed time since a shutdown of a gas turbine engine;
    determining an idle operation time of the engine prior to the shutdown;
    determining a rotor bow mitigation period based on the elapsed time and the idle operation time; and
    prior to initiating a start sequence of the engine, motoring the engine for a duration of the rotor bow mitigation period.

* * * * *